US011878930B2

(12) United States Patent
Hansen

(10) Patent No.: US 11,878,930 B2
(45) Date of Patent: Jan. 23, 2024

(54) METHOD AND APPARATUS FOR SUPPLYING PRE-HEATED PARTICULATE MINERAL MATERIAL FOR MAKING A MINERAL MELT

(71) Applicant: Rockwool International A/S, Hedehusene (DK)

(72) Inventor: Lars Elmekilde Hansen, Roskilde (DK)

(73) Assignee: ROCKWOOL A/S, Hedehusene (DK)

( * ) Notice: Subject to any disclaimer, the term of this patent is extended or adjusted under 35 U.S.C. 154(b) by 245 days.

(21) Appl. No.: 17/368,330

(22) Filed: Jul. 6, 2021

(65) Prior Publication Data

US 2021/0403360 A1 Dec. 30, 2021

Related U.S. Application Data

(63) Continuation of application No. 15/780,717, filed as application No. PCT/EP2016/079389 on Dec. 1, 2016, now abandoned.

(30) Foreign Application Priority Data

Dec. 3, 2015 (EP) .................................... 15197692

(51) Int. Cl.
*C03B 3/00* (2006.01)
*C03B 3/02* (2006.01)
(Continued)
(52) U.S. Cl.
CPC .............. *C03B 3/005* (2013.01); *C03B 3/023* (2013.01); *C03B 5/12* (2013.01); *F27B 3/18* (2013.01); *F27D 3/0033* (2013.01)
(58) Field of Classification Search
None
See application file for complete search history.

(56) References Cited

U.S. PATENT DOCUMENTS 2,354,807 A 8/1944 Fox
3,099,496 A 7/1963 Kayser
(Continued)

FOREIGN PATENT DOCUMENTS

CN 1193559 A 9/1998
CN 1520385 A 8/2004
(Continued)

OTHER PUBLICATIONS

Tao Tianquan, Cement Industry Grinding Technology, Wuhan University of Technology, Jul. 1992, pp. 217-221.
(Continued)

*Primary Examiner* — Lisa L Herring
(74) *Attorney, Agent, or Firm* — DINSMORE & SHOHL LLP

(57) ABSTRACT

A method and an apparatus for making a mineral melt having a cyclone furnace and a separating cyclone, the apparatus having a device for supplying pre-heated particulate mineral material from a bottom of the separating cyclone to an inlet of the cyclone furnace. A material receiving conduit adapted for receiving the pre-heated particulate mineral material from the bottom outlet of the separating cyclone, in which the material receiving conduit has a first pressure. An outlet conduit supplying the particulate mineral material to the inlet of the cyclone furnace having a second pressure, wherein the second pressure is higher than the first pressure, and the particulate mineral material is fluidised and flows from the material receiving conduit to the outlet conduit. A gas-lock valve is provided between the material receiving conduit and the outlet conduit.

9 Claims, 2 Drawing Sheets

(51) Int. Cl.
  *F27B 3/18*   (2006.01)
  *F27D 3/00*   (2006.01)
  *C03B 5/12*   (2006.01)

(56) References Cited

U.S. PATENT DOCUMENTS

| | | |
|---|---|---|
| 4,244,720 A | 1/1981 | Boen |
| 4,257,563 A | 3/1981 | Henrich |
| 4,652,289 A | 3/1987 | Drouet |
| 4,658,591 A | 4/1987 | Alvarez |
| 4,970,830 A | 11/1990 | Schlick |
| 5,724,901 A | 3/1998 | Guy et al. |
| 5,871,619 A * | 2/1999 | Finley ............... C10B 33/02 198/545 |
| 6,110,242 A * | 8/2000 | Young ............... B01D 50/20 406/173 |
| 7,137,759 B1 | 11/2006 | Ambs |
| 7,360,639 B2 | 4/2008 | Sprouse |
| 10,040,712 B2 | 8/2018 | Hansen |
| 2001/0030107 A1 | 10/2001 | Simpson |
| 2005/0172677 A1 | 8/2005 | Jenson et al. |
| 2009/0158777 A1 | 6/2009 | Tenzler et al. |
| 2011/0104014 A1 | 5/2011 | Takafuji et al. |
| 2011/0247920 A1 | 10/2011 | Marchesini |
| 2011/0271649 A1 | 11/2011 | Tetzlaff |
| 2013/0186149 A1 | 6/2013 | Hansen |
| 2013/0199245 A1 | 8/2013 | Bollund |
| 2014/0007622 A1 | 1/2014 | Shock |
| 2014/0345715 A1 | 11/2014 | Hansen |
| 2016/0096687 A1 | 4/2016 | Hauser |
| 2018/0058382 A1 | 3/2018 | Chandran |
| 2018/0073913 A1 | 3/2018 | Hansen |

FOREIGN PATENT DOCUMENTS

| | | |
|---|---|---|
| CN | 102089585 A | 6/2011 |
| CN | 103189320 A | 7/2013 |
| CN | 103813859 A | 5/2014 |
| CN | 104105672 A | 10/2014 |
| EP | 2078704 A1 | 7/2009 |

OTHER PUBLICATIONS

Zhang Shaoming et al., Powder Engineering, Beijing: China Building Materials Industry Press, Aug. 1994, pp. 235-238.

\* cited by examiner

METHOD AND APPARATUS FOR SUPPLYING PRE-HEATED PARTICULATE MINERAL MATERIAL FOR MAKING A MINERAL MELT

REFERENCE TO RELATED APPLICATIONS

This is a Continuation of U.S. National Stage application Ser. No. 15/780,717, filed Jun. 1, 2018, which claims priority to PCT/EP2016/079389, filed Dec. 1, 2016, which claims priority from European patent application No. EP15197692.5, filed Dec. 3, 2015. The entire content of both of which is incorporated herein by reference.

FIELD OF THE INVENTION

The present invention relates to a method and an apparatus for making a mineral melt comprising a cyclone furnace and a separating cyclone, said apparatus further comprising a device for supplying pre-heated particulate mineral material from a bottom of the separating cyclone to an inlet of the cyclone furnace, said device comprising a material receiving conduit adapted for receiving the pre-heated particulate mineral material from the bottom outlet of the separating cyclone, in which material receiving conduit there is a first pressure, and an outlet conduit supplying the particulate mineral material to the inlet of the cyclone furnace, wherein there is a second pressure, wherein said second pressure is higher than said first pressure, and a gas-lock valve provided between said material receiving conduit and said outlet conduit.

BACKGROUND OF THE INVENTION

A method and an apparatus for making a mineral melt of such kind is known from EP 2 078 704 A1.

Furthermore, WO 2013/041392 discloses an apparatus of this kind. In WO 2013/041392 there is disclosed an assembly for supplying particulate material exiting the bottom of a separating cyclone to a feeding conduit for feeding the material into a combustion chamber of a cyclone furnace.

A cyclone furnace system for the production of a mineral melt of the kind described above is disclosed in WO 2013/083464 and WO 03/002469. This system involves suspending powdered coal, or other fuel, in preheated combustion air and combusting the suspended fuel in the presence of suspended particulate mineral material in a circulating combustion chamber, i.e., a combustion chamber in which the suspended particulate materials and air circulate in a system which is or approaches a cyclone circulation system. This is commonly referred to as a cyclone furnace. The suspension of coal in preheated air and the particulate mineral material are introduced through the top or close to the top of the combustion chamber. Within the combustion chamber, combustion of the particulate coal occurs and the particulate material is converted to melt. The melt and particulate material that is not yet melted is thrown onto the walls of the chamber by the circulating gases and will flow down the chamber walls. The melt is collected in a settling tank at the bottom of the chamber.

In order to increase the energy efficiency of the cyclone furnace in WO 03/002469, the exhaust gases, which leave the circulating chamber at a temperature in the range of 1400 to 1700° C., are used to preheat the particulate material. WO 03/002469 teaches that the exhaust gases are quenched to 1000 to 1500° C. and then mixed with the mineral material to preheat it to a temperature of 700 to 1050° C.

In this cyclone furnace system milled waste mineral wool is fed into the riser from the cyclone furnace to the lower preheater cyclone and the collected fly ash is fed into the preheated raw material immediately before it is fed to the cyclone furnace. A problem arising with this setup is that the preheated particulate material which is heated to 750-800° C. in the preheater is being fed from the bottom outlet of the preheater cyclone where there is a first ambient pressure to the combustion chamber inlet where the ambient pressure is much higher. This pressure difference may cause the particulate material to flow in reverse back to the preheater cyclone. As the particulate material may have a wide range in particle size ranging from a few μm up to e.g. 5 mm, there is a risk in particular that the smaller particles will flow backwards in the system. Though most of the particulate mineral material is acting as a fluid some of it will fall to the bottom and eventually clog up the conduit system. The latter is particularly the case when the particulate material comprises e.g. recycled mineral wool that tends to form lumps in the size of a few cm. Also carry-over material in the cyclone furnace exhaust gas may increase the tendencies for lump forming of the particulate material.

On this background, it is an object of the present invention to provide a method and an apparatus of the initially mentioned kind, avoiding the above-mentioned problem concerning the dosing of the preheated particulate mineral material due to the risk of back flow and clogging of the particulate material feeding system.

SUMMARY OF THE INVENTION

This object is achieved by a method and an apparatus of the initially mentioned kind, wherein that the gas-lock valve comprises an elongated housing, which is inclined upwards from said material receiving conduit at a lowermost section of the housing to said outlet conduit at an uppermost section of the housing, and wherein the gas-lock valve is provided with fluidisation means, so that fluidised particulate mineral material can flow due to gravity from the material receiving conduit into the lowermost section of the housing and from the uppermost section of the housing into the outlet conduit.

By both maintaining the particulate mineral material in a fluidised state and by providing a gas-lock valve the risk of back flow is avoided as the fluidised mineral material inside the gas-lock prevents the pressure difference to cause a back-flow of gas. The material receiving conduit and the outlet conduit are preferably substantially vertically oriented and the elongated housing of the gas-lock valve provided therebetween is inclined, so that the fluidised particulate material flows upwards from the receiving conduit to the outlet conduit due to gravitational pressure of the particulate material supplied to the receiving conduit.

Preferably, stirring means are provided in the gas-lock valve, such as a screw conveyor or worm conveyor. The stirring means preferably comprises an axle extending longitudinally in the elongated housing of the gas lock valve, and said axle is preferably provided with radially extending elements to facilitate the stirring effect. Hereby, the problem is addressed by a combination of two valve types, where the screw conveyor acts as a rotation shaft to keep the particulate mineral material in a fluidised state.

Furthermore, one or more air inlets are preferably provided in the gas-lock valve for fluidisation of the particulate material and thereby providing compensation of the pressure difference. This further assists in keeping the particulate material in a fluidised state and to keep the material flowing towards the combustion chamber. In particular, it is found advantageous that one or more air inlets are provided in the material receiving conduit for fluidising the particulate material before the material enters the elongated housing.

Advantageously, the bottom outlet of the separating cyclone is connected to a plurality of material receiving conduits via a material distributor. Further, the at least one air-inlet may be supplied with hot exhaust gases. Hereby, the temperature of the pre-heated particulate mineral material is maintained high.

BRIEF DESCRIPTION OF THE DRAWINGS

In the following the invention is disclosed in further detail with reference to the accompanying drawings, in which.

DETAILED DESCRIPTION OF THE INVENTION

Figure 1:
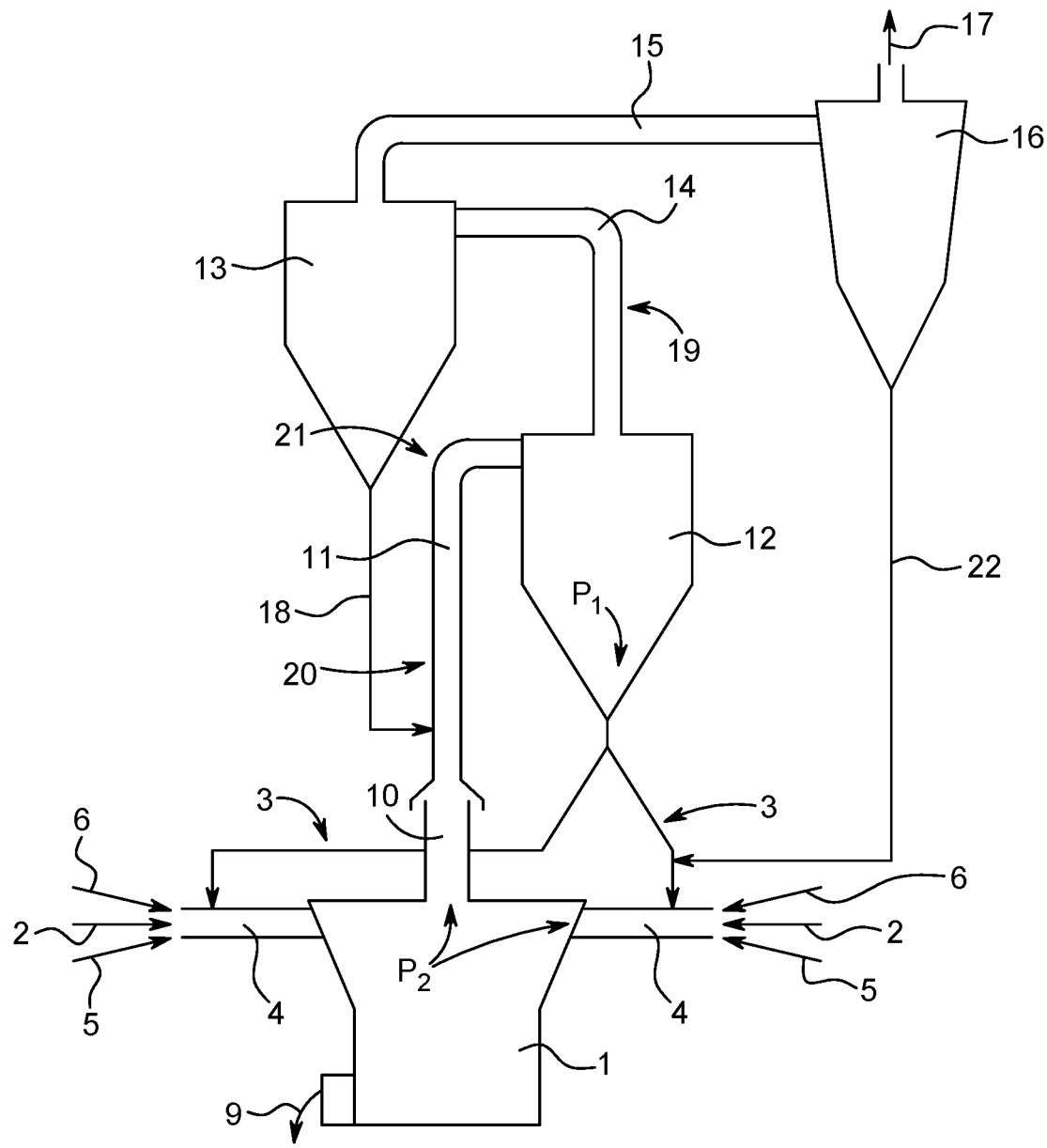
FIG. 1 is a schematic diagram of an apparatus according to a preferred embodiment of the present invention.

FIG. 1 shows a circulating combustion chamber 1 which comprises a cylindrical top section, a frustoconical bottom section and a cylindrical base section. Particulate fuel is introduced into the circulating combustion chamber from supply 2 and is preferably coal. Preheated mineral material is introduced into the circulating combustion chamber via a mineral material conduit 3. The coal and mineral material are introduced together with combustion air via an inlet conduit 4 and secondary air which is provided in compressed air supply 5 and is introduced through at least two tangential inlets such as a lance (not shown) into the circulating combustion chamber 1 to ensure thorough mixing of the coal 2 with the combustion air 6 and to sustain the circulating motion of the combustion gases and suspended material in the circulating combustion chamber 1. Secondary fuel, in this case natural gas may also be injected through supply (not shown) into the base section of the circulating combustion chamber 1.

The coal 2 is combusted in the combustion gas 6, which is preferably oxygen-enriched air 5, in the circulating combustion chamber 1. The resultant melt 9 is collected in the base zone of the circulating combustion chamber 1 and exits the chamber via an outlet. The exhaust gases are fed through the flue 10 at the top of the circulating combustion chamber 1 to the first conduit 11 where they are used to heat the granular mineral materials about to be fed into the circulating combustion chamber 1. The exhaust gases are then led to a first pre-heater cyclone 12 where they are separated from the mineral materials which are at this point mixed together. The exhaust gases flow from the first pre-heater cyclone 12 to the second pre-heater cyclone 13 via a second conduit 14. Following the second pre-heater cyclone 13 the exhaust gases flow through conduit 15 to a dust cyclone 16 and into a further treatment 17 where indirect heat exchange with the combustion gas occurs to preheat the combustion gas. The exhaust gases are then treated to make them safe to pass to the atmosphere such as by filter (not shown).

The mineral materials are preheated prior to being added to the circulating combustion chamber 1. In detail, a first mineral material which is typically a raw stone material is supplied from supply 19 to second conduit 14 and undergoes initial preheating in second pre-heater cyclone 13. The first mineral material is then passed through first mineral material conduit 18 and introduced into first conduit 11 and subsequently passes to the first pre-heater cyclone 12. The second mineral material is provided from supply 20 to the first conduit 11 downstream of the first mineral material. The second mineral material is generally a processed mineral material typically bonded mineral fibres, such as recycled mineral fibres. To ensure that NOx reducing conditions are generated in the first pre-heater cyclone 12, nitrogenous materials such as ammonia can be added at position 21 into the first conduit 11 immediately before the first pre-heater cyclone 12. However, as the waste mineral wool supplied at 20 contains binder with nitrogenous content it may advantageously be obsolete to add ammonia to the conduit 11 as the ammonia contained in the recycled waste mineral wool is sufficient to ensure the NOx reducing conditions in the first pre-heater cyclone 12. Some of the first mineral materials may be carried up with the exhaust gases from the second pre-heater cyclone 13 through conduit 15. These are separated from the exhaust gases in dust cyclone 16 or in a filter and recycled back to join the preheated mineral materials via conduit 22.

The exhaust gases leave the circulating combustion chamber 1 via the flue 10. The exhaust gases enter the first conduit 11 and are quenched from a temperature of between 1500 and 1900° C., usually around 1650° C. to a temperature of between 1000 and 1500° C. normally around 1300° C. by quenching air. The first mineral material is introduced into the first conduit 11 via inlet downstream of the second mineral material which is introduced into the first conduit 11 via the conduit 20.

The chamber is generally a vertical rather than a horizontal furnace. It normally has a cylindrical top section into which the fuel, mineral material and combustion gas are injected, a frustoconical bottom section and a base section in which the melt can be collected. Alternatively the chamber can be wholly cylindrical. The base section is preferably an integral part of the chamber and can be simply the end part of the frustoconical bottom region or can be a cylindrical section at the end of the bottom region. Preferably, the diameter of the base section is not larger than the diameter of the top section in contrast to traditional systems which often employ a tank at the base of the chamber of enhanced volume.

The base section has an outlet for the mineral melt through which the melt passes as a stream 9. This stream 9 can then be subjected to fiberisation in any conventional manner, for instance using a cascade spinner or a spinning cup or any other conventional centrifugal fiberising process. Alternatively, the mineral melt can be used in other industrial processes.

The general motion of gases and suspended particulate material in the circulating combustion chamber is a cyclone motion. This is created by introduction of the combustion gas 6, as well as particulate fuel 2 and mineral material, at an appropriate angle to sustain the swirling motion. When used, the secondary combustion gas 5 is also preferably introduced in the same direction so as to sustain the circulating currents. The exhaust gases become separated from the mineral melt which is collected in the base of the chamber, and are passed to a heat exchange system, usually via a flue in the top of the circulating combustion chamber. The exhaust gases are then used to preheat the mineral material in a heat exchange system. The exhaust gases typically leave the circulating combustion chamber at a temperature of between 1300 and 1900° C., usually 1500 to 1750° C., such as around 1550 to 1650° C.

The heat exchange system preferably comprises at least one and preferably two or even three pre-heater cyclones 12, 13. The first and second mineral materials are typically added to a first conduit 11 which transports exhaust gases from the circulating combustion chamber 1 to the first pre-heater cyclone 12. In the first pre-heater cyclone 12, the exhaust gases are separated from the mineral material. The mineral material, which comprises the first and second mineral materials mixed, is passed through mixed mineral material conduits 3 to the inlets of the circulating combustion chamber 1 to be melted. In FIG. 1 two inlets 4 to the cyclone furnace are shown. There might be only a single inlet 4 or more than two inlets 4, such as three, four or more.

Figure 2:
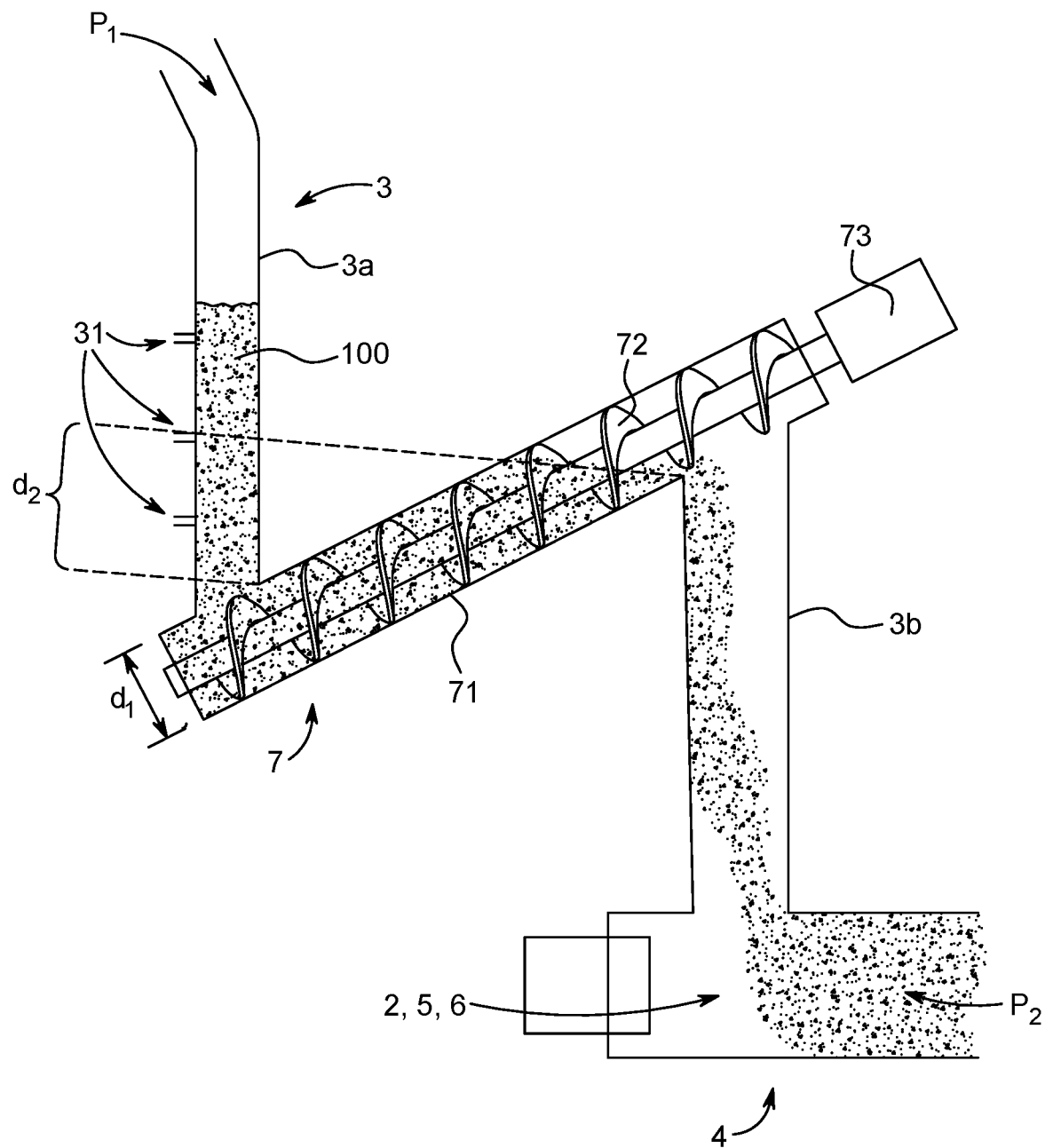
FIG. 2 is a schematic drawing of an apparatus for supplying pre-heated particulate mineral material according to an embodiment of the invention.

The pressure $P_1$ of the bottom outlet of the first pre-heater cyclone 12 is much lower than the pressure $P_2$ at the inlet to the combustion chamber 1. This pressure difference gives problems with regard to the dosing of the pre-heated particulate mineral material as the pressure difference will stimulate a "back-flow" in the outlet conduit 3 if no means are taken to avoid this. However, as shown in FIG. 2, this problem is addressed by providing a gas-lock valve 7 in the conduit 3. If the cyclone furnace has more than one inlet 4 there will be provided a gas-lock valve 7 for each conduit 3 and a material distributor will be arranged between the bottom outlet of the separating cyclone 12 and the gas-lock valves 7. The or each gas-lock valve 7 comprises a material receiving conduit 3a adapted for receiving the pre-heated particulate mineral material 100 from the bottom outlet of the separating cyclone 12, wherein there is the first pressure $P_1$. The apparatus further comprises an outlet conduit 3b supplying the particulate mineral material 100 to the inlet 4 of the cyclone furnace 1, wherein there is the second pressure $P_2$. The particulate mineral material 100 is fluidised and flows due to gravity from the material receiving conduit 3a to the outlet conduit 3b through a gas-lock valve 7, which comprises an elongated housing 71 providing an inclined particulate material flow passage between the receiving conduit 3a and the outlet conduit 3b. As can be seen in FIG. 2, both the receiving conduit 3a and the outlet conduit 3b are substantially vertically oriented. The fluidised particulate material flow is flowing due to gravitational pressure provided by the material that is supplied from the bottom of the separating cyclone to the receiving conduit 3a and the inclination of the elongated housing 71 therefore is directing the material flow upwards in the gas-lock valve 7. Hereby, the constant presence of particulate material in the gas-lock valve 7 prevents a back-flow as the two pressures $P_1$ and $P_2$ at either ends are prevented from equalising each other.

The elongated housing 71 is preferably provided with stirring means, such as a screw conveyor 72, also sometimes referred to as a worm conveyor. The screw conveyor 72 is driven by an electric motor or similarly suitable drive means 73. The screw conveyor 72 is not provided to transport the material, but to stir the particulate material in the elongated housing 71 to keep the particulate material in a fluidised state.

One or more air inlets 31 are preferably provided in the wall of the material conduit 3a of the gas-lock valve 7 to keep the particulate mineral material 100 in a fluidised state.

The elongated housing 71 is inclined upwards from said material receiving conduit 3a at a lowermost section of the housing 71 to said outlet conduit 3b at an uppermost section of the housing 71, so that the fluidised particulate mineral material 100 flows due to gravity from the material receiving conduit 3a into the housing 71 at the lowermost section thereof and from the housing 71 into the outlet conduit 3b at the uppermost section of the upwardly inclined housing 71. The gravitational flow of the material 100 is due to the column of fluidised mineral material which is built up in the receiving conduit 3a which is higher than the level $d_2$ between the mineral material entry point and the mineral material exit point in the inclined elongated housing 71.

The inclination of the elongated housing 71 may be in the order of 20-50 degrees, such as 30 degrees, relative to the horizontal. The elongated housing 71 has a diameter $d_1$ and the amount of fluidised material present is at least an amount rising up in the first conduit 3a to a level $d_2$ which is at least above the outlet point where the particulate material flows out of the elongated housing 71 and into the outlet second conduit 3b. This level $d_2$ is preferably at least similar to the diameter $d_1$ of the elongated housing 71, as indicated in FIG. 2, which ensures stability of the gas-lock valve 7 even if there are some pressure pulsation at the either end thereof. This means that the elongated housing 71 is filled with material between the inlet at the lowermost end of the housing 71 and the outlet at the uppermost end of the housing 71 so that no back flow of gas can occur as the particulate material then prevents the gas at the higher pressure $P_2$ at the outlet from entering into the housing 71 and escape to the material receiving conduit 3a where the low pressure $P_1$ is present.

Above, the invention is described with reference to a preferred embodiment. It is realised that other variants, dimension relationships and other embodiments may be provided without departing from the scope of the invention as defined in the accompanying claims. For instance, by the invention it is realised that the gas-lock valve would work even if the height $d_2$ in the receiving conduit 3a is low, but practice has shown that it is advantageous that this height $d_2$ should at least correspond to $d_1$. The reason is that there occasionally may occur some pressure pulsation in the system and if the level in the receiving conduit 3a is too low there is a risk that a back-pressure may blow the elongated housing of the gas-lock valve empty.

The invention claimed is:

1. A method for supplying pre-heated particulate mineral material from a separating cyclone to an inlet of a cyclone furnace, said method comprising:
    providing a material receiving conduit, an inclined elongated housing and an outlet conduit, wherein;
    the material receiving conduit is positioned to receive the pre-heated particulate mineral material from the separating cyclone;
    the outlet conduit is positioned to supply the pre-heated particulate mineral material to the inlet of the cyclone furnace; and
    the inclined elongated housing interconnects the material receiving conduit to the outlet conduit, the inclined elongated housing having a lowermost section connected to a lowermost section of the material receiving conduit and being inclined upwardly to an uppermost section of the inclined elongated housing that is connected to an uppermost section of the outlet conduit;
    receiving the pre-heated particulate mineral material in the material receiving conduit from the separating cyclone such that the pre-heated particulate mineral material is built up in the material receiving conduit from the lowermost section of the material receiving conduit to at least a mineral material entry level;
    fluidising the pre-heated particulate mineral material in the material receiving conduit;
    flowing the fluidised pre-heated particulate mineral material from the lowermost section of the material receiving conduit into the lowermost section of the inclined elongated housing and upwardly in the inclined elongated housing to a material exit level at the uppermost section of the inclined elongated housing;

the material exit level being vertically lower than the mineral material entry level;

keeping the fluidised pre-heated particulate mineral material in the inclined elongated housing in a fluidized state such that the fluidised pre-heated particulate mineral material flows from the lowermost section of the inclined elongated housing to the material exit level due to gravity and the material exit level being vertically lower than the mineral material entry level;

receiving the fluidised pre-heated particulate mineral material into the uppermost section of the outlet conduit from the uppermost section of the inclined elongated housing; and a second pressure in the outlet conduit being higher than a first pressure in the material receiving conduit, a constant presence of the fluidised pre-heated particulate mineral material in the inclined elongated housing preventing a backflow from the outlet conduit to the material receiving conduit.

2. The method according to claim 1, wherein the material receiving conduit and the outlet conduit are arranged substantially vertically.

3. The method according to claim 1, wherein one or more air inlets are provided in the material receiving conduit for fluidisation of the pre-heated particulate mineral material.

4. The method according to claim 1, wherein one or more air inlets are provided in the inclined elongated housing for fluidisation of the particulate mineral material.

5. The method according to claim 1, wherein an inclination of the inclined elongated housing is between 20 and 50 degrees relative to horizontal.

6. A method for making a mineral melt, comprising the steps of:

providing a cyclone furnace with an inlet;

providing a separating cyclone with a bottom outlet; and supplying pre-heated particulate mineral material from the separating cyclone to the inlet of a cyclone furnace according to the method of claim 1.

7. A method for supplying pre-heated particulate mineral material from a separating cyclone to an inlet of a cyclone furnace, said method comprising:

providing a material receiving conduit, an inclined elongated housing and an outlet conduit, wherein;

the material receiving conduit is positioned to receive the pre-heated particulate mineral material from the separating cyclone;

the outlet conduit is positioned to supply the pre-heated particulate mineral material to the inlet of the cyclone furnace; and the inclined elongated housing interconnects the material receiving conduit to the outlet conduit, the inclined elongated housing having a lowermost section connected to a lowermost section of the material receiving conduit and being inclined upwardly to an uppermost section of the inclined elongated housing that is connected to an uppermost section of the outlet conduit;

receiving the pre-heated particulate mineral material in the material receiving conduit from the separating cyclone such that the pre-heated particulate mineral material is built up in the material receiving conduit from the lowermost section of the material receiving conduit to at least a mineral material entry level;

providing one or more air inlets in the material receiving conduit and/or in the inclined elongated housing;

fluidising the pre-heated particulate mineral material in the material receiving conduit and/or the inclined elongated housing using the one or more air inlets;

flowing the fluidised pre-heated particulate mineral material from the lowermost section of the material receiving conduit into the lowermost section of the inclined elongated housing and upwardly in the inclined elongated housing to a material exit level at the uppermost section of the inclined elongated housing;

the material exit level being vertically lower than the mineral material entry level;

providing a further stirring means in the inclined elongated housing;

keeping the fluidised pre-heated particulate mineral material in the inclined elongated housing in a fluidized state using the further stirring means such that the fluidised pre-heated particulate mineral material flows from the lowermost section of the inclined elongated housing to the material exit level due to gravity and the material exit level being vertically lower than the mineral material entry level;

receiving the fluidised pre-heated particulate mineral material into the uppermost section of the outlet conduit from the uppermost section of the inclined elongated housing; and a second pressure in the outlet conduit being higher than a first pressure in the material receiving conduit, a constant presence of the fluidised pre-heated particulate mineral material in the inclined elongated housing preventing a backflow from the outlet conduit to the material receiving conduit.

8. The method of claim 7, wherein the one or more air inlets are in the material receiving conduit and the further stirring means is a screw conveyor extending along a length of the inclined elongated housing.

9. The method according to claim 8, wherein the screw conveyor comprises an axle extending longitudinally inside the inclined elongated housing, said axle being provided with radially extending elements.

* * * * *